United States Patent
Yoshimura

(10) Patent No.: US 7,502,143 B2
(45) Date of Patent: Mar. 10, 2009

(54) SIGNAL PROCESSING METHOD, SIGNAL OUTPUT APPARATUS, SIGNAL PROCESSING APPARATUS, IMAGE PROCESSING APPARATUS, AND IMAGE FORMING APPARATUS

(75) Inventor: Hideyoshi Yoshimura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 442 days.

(21) Appl. No.: 11/079,213

(22) Filed: Mar. 15, 2005

(65) Prior Publication Data

US 2005/0213158 A1 Sep. 29, 2005

(30) Foreign Application Priority Data

Mar. 24, 2004 (JP) .............................. 2004-087155

(51) Int. Cl.
G06K 15/00 (2006.01)
G06K 9/40 (2006.01)
G06T 5/00 (2006.01)
H04N 1/407 (2006.01)
H04N 1/409 (2006.01)
H04N 1/38 (2006.01)
H04N 1/46 (2006.01)

(52) U.S. Cl. .................. 358/3.26; 358/463; 358/532; 382/275

(58) Field of Classification Search ............... 358/3.26, 358/533, 3.06, 3.1, 518, 532, 463; 700/34; 704/223; 708/250, 251, 252; 710/1; 375/245, 375/332, 150; 348/614, 616; 382/234, 167, 382/232, 275, 162; 324/309; 347/74
See application file for complete search history.

(56) References Cited

U.S. PATENT DOCUMENTS

| | | | | |
|---|---|---|---|---|
| 4,495,560 A | * | 1/1985 | Sugimoto et al. | 700/34 |
| 4,845,654 A | * | 7/1989 | Harada et al. | 708/250 |
| 5,136,615 A | * | 8/1992 | Tanoi | 375/245 |
| 5,195,105 A | * | 3/1993 | Hashimoto et al. | 375/150 |
| 5,305,347 A | * | 4/1994 | Roschmann et al. | 375/150 |
| 5,317,599 A | * | 5/1994 | Obata | 375/332 |
| 5,341,177 A | * | 8/1994 | Roy et al. | 348/614 |
| 5,557,429 A | * | 9/1996 | Hirose | 358/532 |
| 5,677,985 A | * | 10/1997 | Ozawa | 704/223 |
| 5,909,520 A | * | 6/1999 | Garcia | 382/234 |
| 6,069,915 A | * | 5/2000 | Hulbert | 375/150 |
| 6,192,265 B1 | * | 2/2001 | Carlsen et al. | 324/309 |
| 6,327,685 B1 | * | 12/2001 | Koprowski et al. | 714/733 |
| 6,334,187 B1 | * | 12/2001 | Kadono | 382/232 |

(Continued)

FOREIGN PATENT DOCUMENTS

JP 11-17938 1/1999

(Continued)

*Primary Examiner*—Twyler L Haskins
*Assistant Examiner*—Jonathan R Beckley
(74) *Attorney, Agent, or Firm*—Birch, Stewart, Kolasch & Birch, LLP

(57) ABSTRACT

A pseudo-random number generator comprises a controller, a plurality of LFSRs, a FIR filter and a normalizer. The pseudo-random number generator initializes the LFSRs in such a manner that each LFSR has a predetermined phase difference with the other LFSRs, sets the coefficient of the FIR filter in accordance with the desired frequency characteristic of a noise signal, and sets a parameter in the normalizer. The operation of the LFSRs is started, thereby acquiring a noise signal having the desired frequency characteristic.

17 Claims, 6 Drawing Sheets

U.S. PATENT DOCUMENTS

| | | | |
|---|---|---|---|
| 6,485,134 B2 * | 11/2002 | Dunand | 347/74 |
| 6,668,012 B1 * | 12/2003 | Hershey et al. | 375/150 |
| 6,782,133 B2 * | 8/2004 | Yokose et al. | 382/232 |
| 7,103,214 B2 * | 9/2006 | Kusakabe et al. | 382/162 |
| 7,119,760 B2 * | 10/2006 | Edge et al. | 345/2.1 |
| 7,188,131 B2 * | 3/2007 | Bardouillet | 708/251 |
| 7,212,565 B2 * | 5/2007 | Kaegi et al. | 375/150 |
| 2001/0014174 A1 * | 8/2001 | Yamamoto | 382/167 |
| 2003/0228067 A1 * | 12/2003 | Miyake et al. | 382/275 |
| 2004/0001621 A1 * | 1/2004 | Kusakabe et al. | 382/164 |
| 2004/0010633 A1 * | 1/2004 | Ishikawa | 710/1 |
| 2004/0061903 A1 * | 4/2004 | Fujita | 358/518 |
| 2004/0107230 A1 * | 6/2004 | Bardouillet | 708/252 |
| 2004/0196408 A1 * | 10/2004 | Ishikawa et al. | 348/616 |
| 2005/0031223 A1 * | 2/2005 | Kusakabe et al. | 382/275 |

FOREIGN PATENT DOCUMENTS

| | | |
|---|---|---|
| JP | 2894117 B2 | 3/1999 |
| JP | 2003-281515 A | 3/2003 |
| JP | 2003-142946 | 5/2003 |

* cited by examiner

SIGNAL PROCESSING METHOD, SIGNAL OUTPUT APPARATUS, SIGNAL PROCESSING APPARATUS, IMAGE PROCESSING APPARATUS, AND IMAGE FORMING APPARATUS

CROSS REFERENCE TO RELATED APPLICATIONS

This nonprovisional application claims priority under 35 U.S.C. §119(a) on Patent Application No. 2004-87155 filed in Japan on Mar. 24. 2004, the entire contents of which are hereby incorporated by reference.

BACKGROUND OF THE INVENTION

1. Field of the Invention

The present invention relates to a signal processing method, a signal output apparatus, a signal processing apparatus, an image processing apparatus and an image forming apparatus in which an arbitrary frequency characteristic can be set and a noise signal is generated with a comparatively low resource.

2. Description of Related Art

Conventionally, for an image output apparatus such as a digital color copying machine or an ink jet copying machine, there has been proposed an image signal processing apparatus in which image quality is designed taking a visual characteristic of a human being into consideration and an input image signal is processed in such a manner as to acquire a visually preferable image (see, for example, Japanese Patent No. 2894117). In the image signal processing apparatus described in Japanese Patent No. 2894117, a noise signal of a spatial frequency response difficult to visually recognize is superposed on an input image signal read from an original, so that image noises and gray level difference existing in the original are reduced without adversely affecting image quality characteristics such as sharpness and color.

In the above-described image signal processing apparatus, the noise signal is generated utilizing a two-dimensional Fourier transform or a inverse Fourier transform in order to give a required frequency characteristic to a noise signal to be superposed. Generally, in this two-dimensional Fourier transform, two-dimensional data is divided into rows and columns, and after executing a one-dimensional Fourier transform for each row, the one-dimensional Fourier transform is executed for each column, thereby obtaining a desired result. This method requires a work memory of the same capacity as the amount of the required noise data. In addition, the two-dimensional Fourier transform requires an additional processing time in response to the amount of the required noise data. In the case where a vast amount of noise data is required, therefore, there arises a problem that the noise data cannot be obtained before the end of the process. In order to avoid this disadvantage, there has been proposed a method for storing the noise data calculated in advance in a memory and using the noise data. However, this method has a problem that the memory for storing the noise data requires as much capacity as the amount of the required noise data.

BRIEF SUMMARY OF THE INVENTION

The present invention has been made with the aim of solving the above problem, and it is an object of the present invention to provide a signal processing method, a signal output apparatus, a signal processing apparatus, an image processing apparatus and an image forming apparatus, in which a predetermined number of pseudo-random numbers having different phases are generated, a convolution operation is performed with the generated pseudo-random numbers and a weighted matrix determined by the desired frequency characteristic of an output signal, and a noise signal to be superposed on an input signal is generated based on the result of the convolution operation, and thereby generating a noise signal having the desired frequency characteristic at high speed with a comparatively low resource without preparing a large capacity of work memory.

A signal processing method according to the present invention is a signal processing method for superposing a noise signal generated based on pseudo-random numbers on an input signal to generate an output signal, comprising the steps of: generating a predetermined number of pseudo-random numbers having different phases; executing a convolution operation with the generated pseudo-random numbers and a weighted matrix determined by a desired frequency characteristic of the output signal; and generating a noise signal to be superposed on the input signal, based on the result of the convolution operation.

According to the present invention, a delay process can be implemented without using any memory even in the case where a microprocessor or the like is employed. In addition, the convolution operation for setting the frequency characteristic can be executed by a simple operation; therefore, the noise signal can be generated by a comparatively low resource without securing a memory capacity dependent on the input signal.

A signal output apparatus according to the present invention is a signal output apparatus for outputting a noise signal generated based on pseudo-random numbers comprising: pseudo-random number generation means for generating a predetermined number of pseudo-random numbers having different phases; and operation means for executing a convolution operation with the pseudo-random numbers generated by the pseudo-random number generation means and a weighted matrix determined by a desired frequency characteristic of the noise signal, wherein the noise signal to be output is generated based on the result of operation of the operation means.

According to the present invention, the pseudo-random numbers of different phases are generated; therefore, a delay process can be executed without using a memory. In addition, the convolution operation for setting the frequency characteristic can be performed by a simple operation; therefore, a noise signal can be generated with a comparatively low resource without securing a memory capacity dependent on the input signal.

A signal processing apparatus according to the present invention is a signal processing apparatus for superposing a noise signal generated based on pseudo-random numbers on an input signal to generate an output signal comprising: pseudo-random number generation means for generating a predetermined number of pseudo-random numbers having different phases; and operation means for executing a convolution operation with the pseudo-random numbers generated by the pseudo-random number generation means and a weighted matrix determined by a desired frequency characteristic of the output signal, wherein the noise signal to be superposed on the input signal is generated based on the result of operation of the operation means.

According to the present invention, the pseudo-random numbers of different phases are generated; therefore, a delay process can be executed without using a memory. In addition, the convolution operation for setting the frequency characteristic can be performed by a simple operation; therefore, a noise signal can be generated with a comparatively low resource without securing a memory capacity dependent on the input signal.

An image processing apparatus according to the present invention is an image processing apparatus for superposing a noise signal generated based on pseudo-random numbers on an input image signal to generate an output image signal, comprising pseudo-random number generation means for generating a predetermined number of pseudo-random numbers having different phases; and operation means for executing a convolution operation with the pseudo-random numbers generated by the pseudo-random number generation means and a weighted matrix determined by a desired spatial frequency response of the output image signal, wherein the noise signal to be superposed on the input image signal is generated based on the result of operation of the operation means.

According to the present invention, the pseudo-random numbers of different phases are generated; therefore, a delay process can be executed without using a memory. In addition, the convolution operation for setting the spatial frequency response can be performed by a simple operation; therefore, a noise signal can be generated with a comparatively low resource without securing a memory capacity dependent on the input image signal. The image processing apparatus according to the present invention is characterized in that the pseudo-random number generation means includes a plurality of LFSRs (Linear Feedback Shift Registers), and an output value of one of the LFSRs has a phase difference with output values of the other LFSRs.

According to the present invention, the pseudo-random numbers are generated by a simple circuit configuration using the LFSRs.

The image processing apparatus according to the present invention is characterized in that the pseudo-random number generation means generates a predetermined number of pseudo-random numbers based on a linear congruential method.

According to the present invention, the pseudo-random numbers are generated with a simple circuit configuration based on the linear congruential method.

The image processing apparatus according to the present invention is characterized by further comprising means for normalizing a result of operation of the operation means.

According to the present invention, the result of the convolution operation is normalized; therefore, the noise signal having the desired spatial frequency distribution can be superposed on the image signal. In addition, the normalization can be implemented by a simple arithmetic circuit or a table lookup circuit using a memory of small capacity; therefore, the noise can be generated with a comparatively low resource without depending on the input image signal.

An image forming apparatus according to the present invention is an image forming apparatus comprising: the image processing apparatus according to any one of the aspects of the present invention; and means for forming an image on a sheet based on the output image signal generated by the image processing apparatus.

According to the present invention, an image is formed on a sheet based on the output image signal generated by superposing a noise signal having the desired frequency characteristic. Therefore, in the case of superposing the noise signal having the frequency characteristic taking a perception characteristic of the human being into consideration, for example, an image noise and gray level difference etc. included in the image can be reduced without adversely affecting the sharpness of the image.

According to the present invention, a delay process can be executed without using a memory even in the case where a microprocessor or the like is used. In addition, the convolution operation for setting the frequency characteristic can be executed by a simple operation; therefore, the noise signal can be generated with a comparatively low resource without securing a memory capacity dependent on the input signal superposed with the noise signal.

According to the present invention, the pseudo-random numbers of different phases are generated; therefore, a delay process can be executed without using a memory. In addition, the convolution operation for setting the frequency characteristic can be performed by a simple operation; therefore, a noise signal can be generated with a comparatively low resource without securing a memory capacity dependent on the input signal superposed with the noise signal.

According to the present invention, the pseudo-random numbers of different phases are generated; therefore, a delay process can be executed without using a memory. In addition, the convolution operation for setting the spatial frequency response can be performed by a simple operation; therefore, a noise signal can be generated with a comparatively low resource without securing a memory capacity dependent on the input image signal superposed with the noise signal.

According to the present invention, the pseudo-random numbers can be generated with a simple circuit configuration using the LFSR; therefore, the noise signal generated based on the pseudo-random numbers can be superposed on the input image signal.

According to the present invention, the pseudo-random numbers can be generated with a simple circuit configuration based on the linear congruential method; therefore, the noise signal generated based on the pseudo-random numbers can be superposed on the input image signal.

According to the present invention, the result of the convolution operation is normalized; therefore, the noise signal having the desired spatial frequency distribution can be superposed on the image signal. In addition, the normalization can be implemented by a simple arithmetic circuit or a table lookup circuit using a memory of small capacity; therefore, the noise can be generated with a comparatively low resource without depending on the input image signal.

According to the present invention, an image is formed on a sheet based on the output image signal generated by superposing a noise signal having the desired frequency characteristic. Therefore, in the case of superposing the noise signal having the frequency characteristic taking the perception characteristic of the human being into consideration, for example, an image noise and gray level difference etc. included in the image can be reduced without adversely affecting the sharpness of the image.

The above and further objects and features of the invention will more fully be apparent from the following detailed description with accompanying drawings.

DETAILED DESCRIPTION OF THE INVENTION

The following description will explain the present invention, based on the drawings illustrating some embodiments thereof.

Embodiment 1

Figure 1:
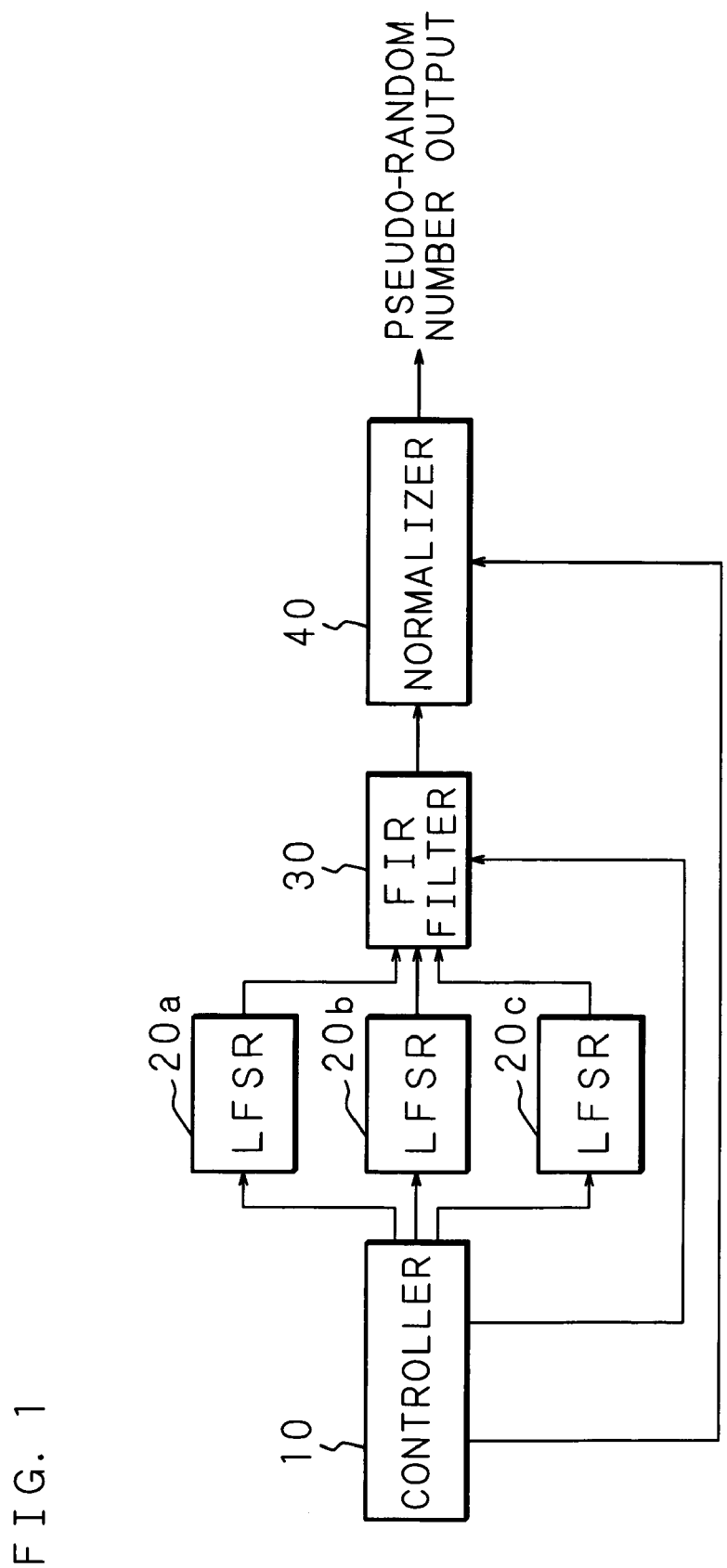
FIG. 1 is a schematic diagram showing a configuration of a pseudo-random number generator according to an embodiment of the present invention.

FIG. 1 is a schematic diagram showing a configuration of a pseudo-random number generator according to an embodiment of the present invention. The pseudo-random number generator according to this embodiment includes a controller 10, LFSRs 20a, 20b, 20c, an FIR (Finite Impulse Response) filter 30 and a normalizer 40, and functions as a signal output apparatus for outputting a noise signal (noise data) used for a two-dimensional image signal (image data).

The controller 10 initializes the LFSRs 20a, 20b, 20c, the FIR filter 30 and the normalizer 40, and sets appropriate parameters for generating a pseudo-random number. Consequently, the controller 10 has a storage area to hold the parameters, and initializes the LFSRs 20a, 20b, 20c, the FIR filter 30 and the normalizer 40 by setting the parameters read from the storage area therein.

The LFSRs 20a, 20b, 20c constitute a pseudo-random number generation circuit for generating a pseudo-random number and, in response to an instruction from the controller 10, can start or stop the operation. Also, values designated by the controller 10 can be set as the output values of the LFSRs 20a, 20b, 20c. The linear congruential method is generally known to generate a pseudo-random number. In this method, the next pseudo-random number $R_{i+1}$ is determined from the current value $R_i$ in the following manner.

$$R_{i+1} = (a \times R_i + b) \bmod c \quad (1)$$

wherein $R_i$, a, b, c is an integer larger than zero.

Figure 2:
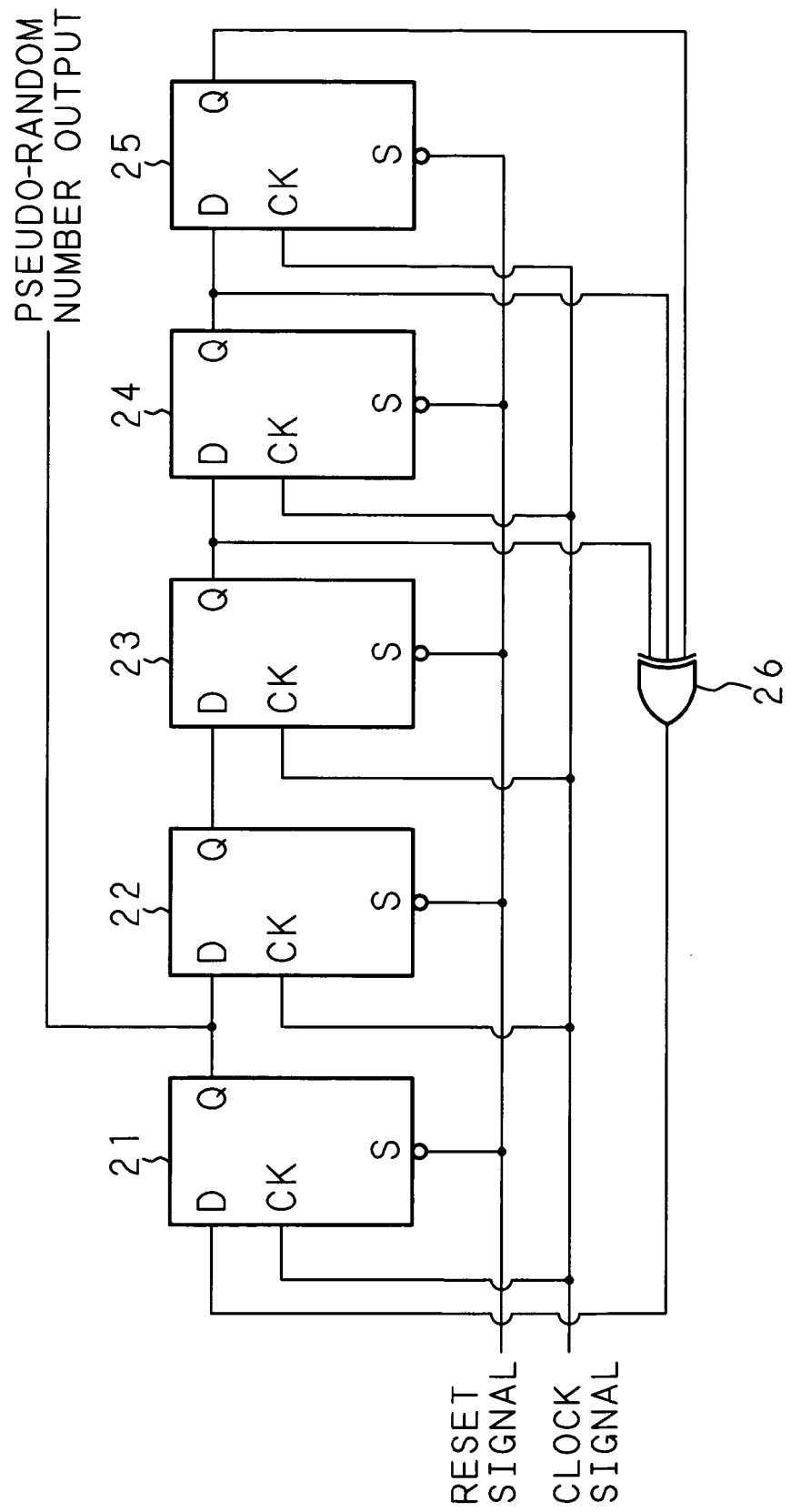
FIG. 2 is a circuit diagram showing one example of a pseudo-random number generation circuit.

In a logic circuit used in a semiconductor, a pseudo-random number generation circuit can be realized by an LFSR (Linear Feedback Shift Register). FIG. 2 is a circuit diagram showing one example of the pseudo-random number generation circuit. The pseudo-random number generation circuit shown in FIG. 2 includes five flip-flop circuits 21 to 25 and an exclusive OR circuit 26. An exclusive OR of outputs of the flip-flop circuits 23, 24, 25 in the shift register is determined in the exclusive OR circuit 26, and the resultant value is regarded as the shift register input. In this case, a one-bit pseudo-random number is output by one clock cycle in the 31 clock cycle periods. In the case where a multi-bit pseudo-random number is required, however, a plurality of shift operations (the shift register input) are performed by one clock and a multi-bit pseudo-random number can be generated regarding a plurality of the flip-flop outputs as multi-bit. The LFSRs 20a, 20b, 20c included in the pseudo-random number generator according to this embodiment are composed of LFSRs with 31-bit long, and an 8-bit pseudo-random number is output by one clock cycle period.

The pseudo-random number generation circuit has a simple configuration and, therefore, is often used as a circuit for generating a pseudo-random number of an M sequence (Maximum length sequence). In addition, a pseudo-random number sequence having a longer period can be generated by increasing the number of stages of the flip-flop circuit and inputting appropriately the exclusive OR of a plurality of flip-flop outputs as the shift register input.

In addition to the LFSRs and linear congruential method described above, the generally known Lagged Fibonacci pseudo-random number generation method and Mersenne Twister pseudo-random number generation method or the like may be used.

The FIR filter 30 functions as operation means for receiving an 8-bit pseudo-random number from each of the LFSRs 20a, 20b, 20c and executing a convolution operation. When the 8-bit pseudo-random number output from the LFSR 20a is defined as RA(t), the 8-bit pseudo-random number output from the LFSR 20b is defined as RB(t) and the 8-bit pseudo-random number output from the LFSR 20c is defined as RC(t) at time point t, an output FIR(t) of the FIR filter 30 can be given as follows.

$$FIR(t) = \frac{IRA(t) + IRB(t) + IRC(t)}{Kj} \quad (2)$$

wherein
IRA(p)=Ka·RA(p−1)+Kb·RA(p)+Kc·RA(p+1),
IRB(p)=Kd·RB(p−1)+Ke·RB(p)+Kf·RB(p+1),
IRC(p)=Kg·RC(p−1)+Kh·RC(p)+Ki·RC(p+1), and
Ka, Kb, Kc, Kd, Ke, Kf, Kg, Kh, Ki and Kj are real numbers.

In addition to the filter changing a frequency characteristic by the convolution operation, a frequency characteristic may be changed by transforming the values of pseudo-random numbers described above into a space expressed in a frequency of a basis function once by discrete cosine transform or discrete wavelet transform etc., calculating an arbitrary coefficient for each transformation value, and executing inverse transform.

The normalizer 40 receives the output from the FIR filter 30 and normalizes histogram distribution. That is, the normalizer 40 functions as means for normalizing the value output from the FIR filter 30 by the conversion based on primary linear approximation or a table lookup method etc.

The operation of the pseudo-random number generator according to this embodiment will be described below with reference to a flowchart.

Figure 3:
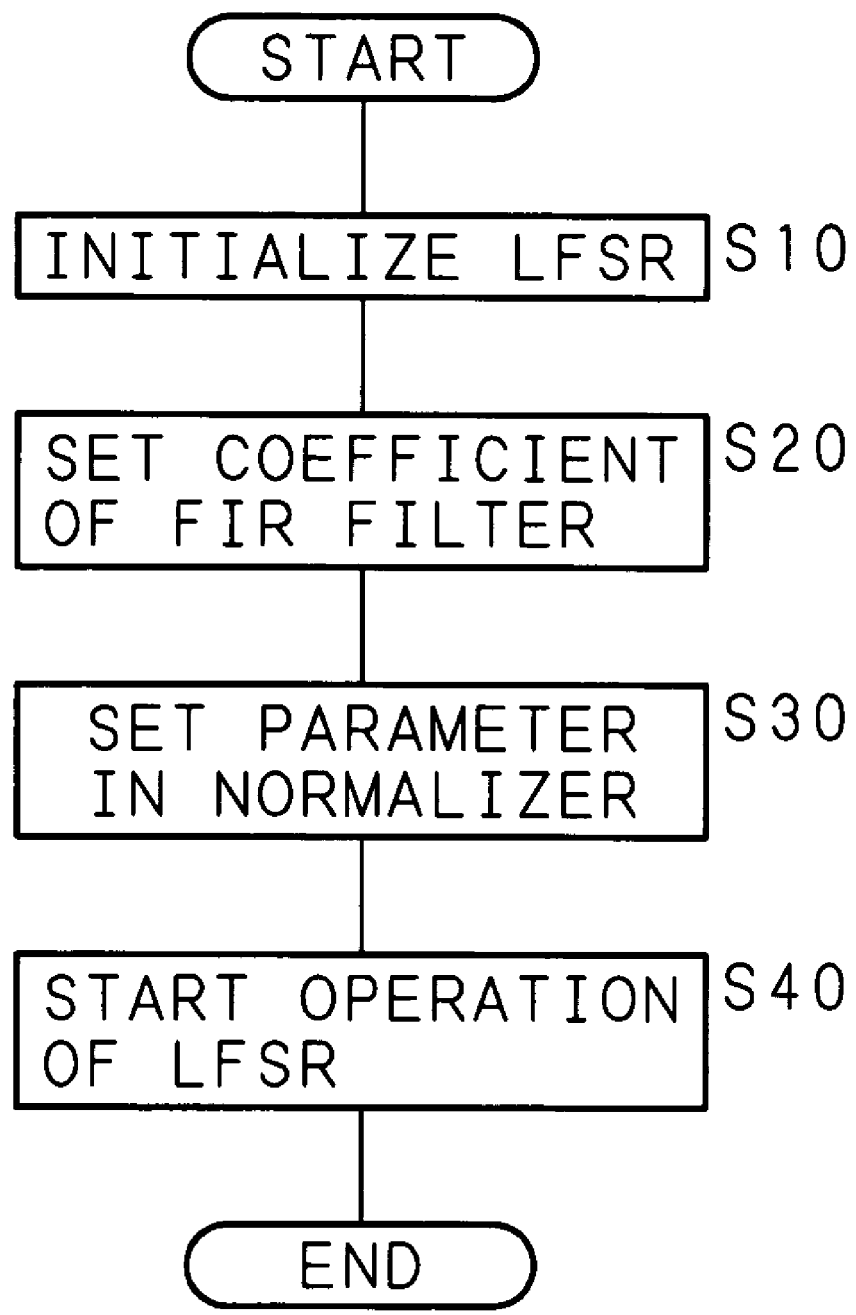
FIG. 3 is a flowchart for describing operations of the pseudo-random number generator.
Figure 4:
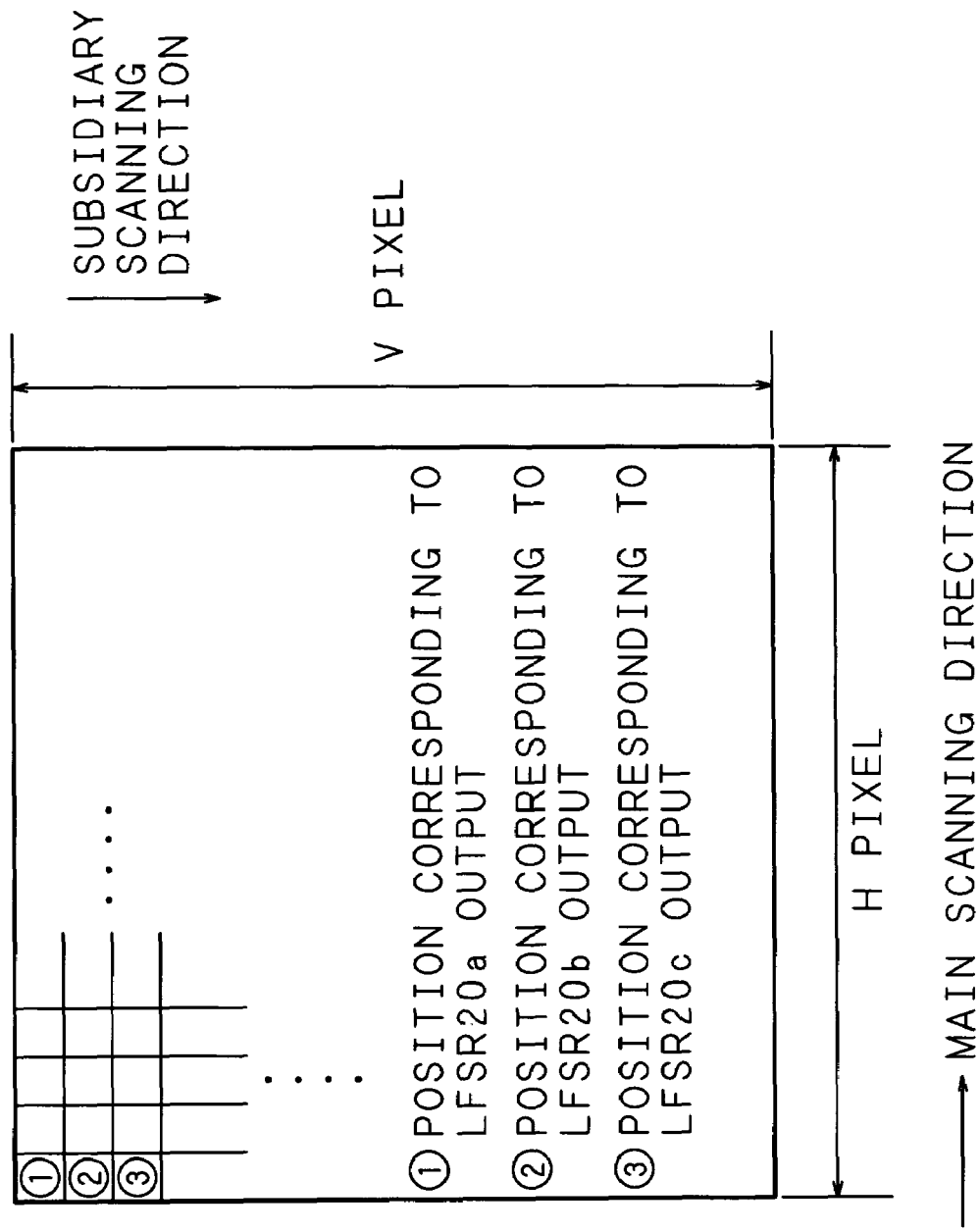
FIG. 4 is an explanation view for describing initialization of an LFSR.

FIG. 3 is a flowchart for describing the operation of the pseudo-random number generator. First, the controller 10 initializes the LFSRs 20a, 20b, 20c (step S10). That is, the controller 10 sets the initial values after causing the LFSRs 20a, 20b, 20c to stop generation of a pseudo-random number. The initial value varies with the two-dimensional size of the desired noise data. FIG. 4 is an explanation view for describing the initialization of the LFSRs 20a, 20b, 20c. When a size along a main scanning direction is H pixels and a size along a subsidiary scanning direction is V pixels for the two-dimensional size of the desired noise data, the LFSR 20b is set to a phase value advanced by H cycles from the LFSR 20a as an initial value. Similarly, the LFSR 20c is set to a phase value advanced by H cycles from the LFSR 20b as an initial value. In H cycles after the start of operation, therefore, the LFSR 20a outputs the same value as the initial value of the LFSR 20b, and the LFSR 20b outputs the same value as the initial value of the LFSR 20c in H cycles after the start of operation. With this configuration, a value delayed by one main scanning line for the output of the LFSR 20c is output by the LFSR 20b, while a value delayed by two main scanning lines for the output of the LFSR 20c is output by the LFSR 20a.

Next, the controller 10 sets the coefficients of the FIR filter 30 (step S20). In the case where the noise data mainly including a high frequency component is desired from the pseudo-random number generator, the coefficients are set as follows so that the FIR filter 30 may function as a high-pass filter.

$$Ka=Kb=Kc=Kd=Kf=Kg=Kh=Ki=-1$$

$$Ke=9$$

$$Kj=1 \qquad (3)$$

In the case where the noise data mainly including a low frequency component is desired, on the contrary, the coefficients are determined as follows so that the FIR filter 30 may function as a low-pass filter.

$$Ka=Kb=Kc=Kd=Ke=Kf=Kg=Kh=Ki=1$$

$$Kj=9 \qquad (4)$$

The coefficients of the FIR filter 30 are specified in advance in accordance with the frequency characteristic and the filter size of the desired noise data. These coefficients are stored in a predetermined storage area in the controller 10 in advance. At the time of initialization, a value of the filter coefficients is read from the storage area and is set as a value of the FIR filter 30.

Figure 5:
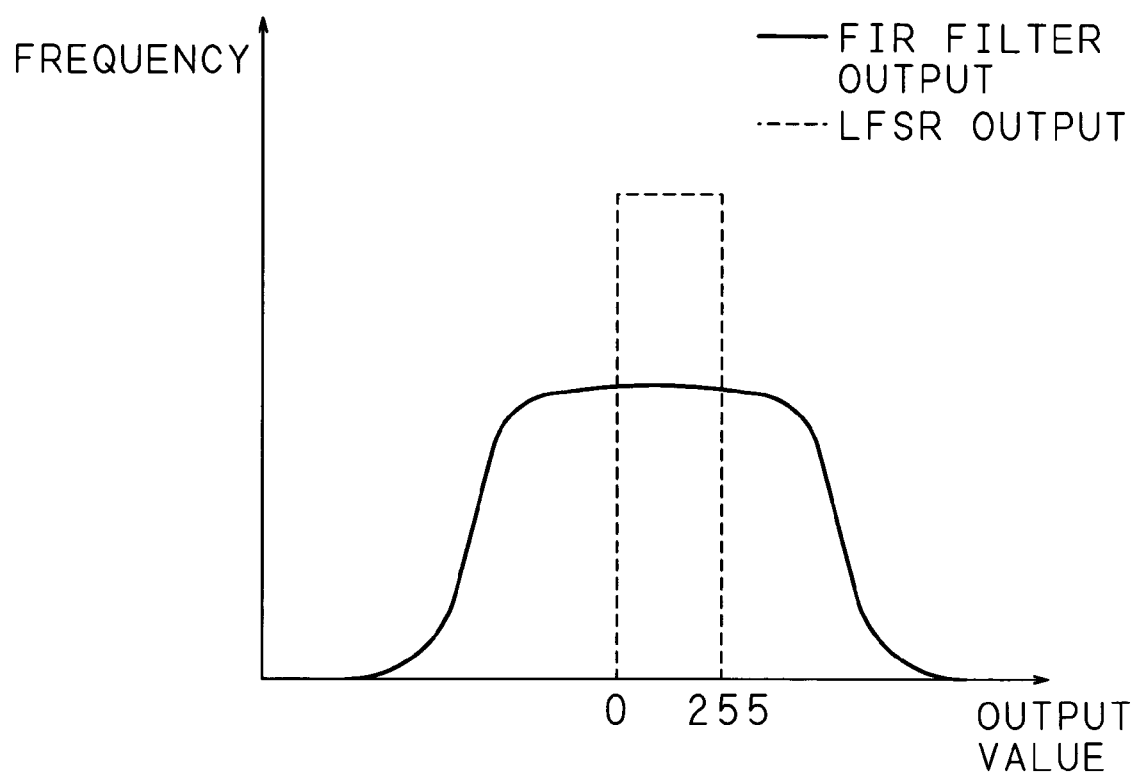
FIG. 5 is a graph showing output distribution of the LFSR and an FIR filter.

Next, the controller 10 sets the parameters in the normalizer 40 (step S30). FIG. 5 is a graph showing output distribution of the LFSR 20a and the FIR filter 30. A histogram is plotted with an abscissa representing an output value and an ordinate representing a frequency. As shown in FIG. 5, the distribution of the output of the FIR filter 30 changes with the output of the LFSR 20a.

The distribution of the required output value and frequency is similar to that of the output of the LFSR 20a. In the normalizer 40, therefore, the input value from the FIR filter 30 is converted to a unique value. This conversion employs a method for defining a plurality of sections in accordance with the input value and calculating by primary linear approximation for each section, or a table lookup method for accessing a table memory with an input value as an address and using the read value as a conversion result.

Next, the controller 10 starts the operations of the LFSRs 20a, 20b, 20c (step S40). As a result, the LFSRs 20a, 20b, 20c start to operate, and the noise data having the desired frequency characteristic can be acquired from the normalizer 40. By setting the coefficients expressed by Equations (3), for example, the FIR filter 30 acts as a high-pass filter and, thus, can generate noise data difficult to recognize with human eyes. This noise data is superposed on, for example, image data to produce an effect of shielding a pseudo-contour.

According to this embodiment, the filter operation is executed based on a total of nine values using the three LFSRs 20a, 20b, 20c. By preparing more LFSRs and increasing the number of the data and coefficients used for convolution of the filter operation, however, the frequency characteristic of the noise data can be further improved. In addition, according to this embodiment, for the purpose of application to the two-dimensional image processing, the same phase difference is set among the LFSRs 20a, 20b, 20c and the two-dimensional processing is employed for the FIR filter 30. Nevertheless, an application to a higher dimension is of course possible.

Embodiment 2

In Embodiment 1, the present invention is described above as an application to a pseudo-random number generator for outputting noise data. The present invention is also applicable to an image processing apparatus and an image forming apparatus such as a digital copying machine or an ink jet copying machine to superpose the noise data output from the pseudo-random number generator on the image data.

Figure 6:
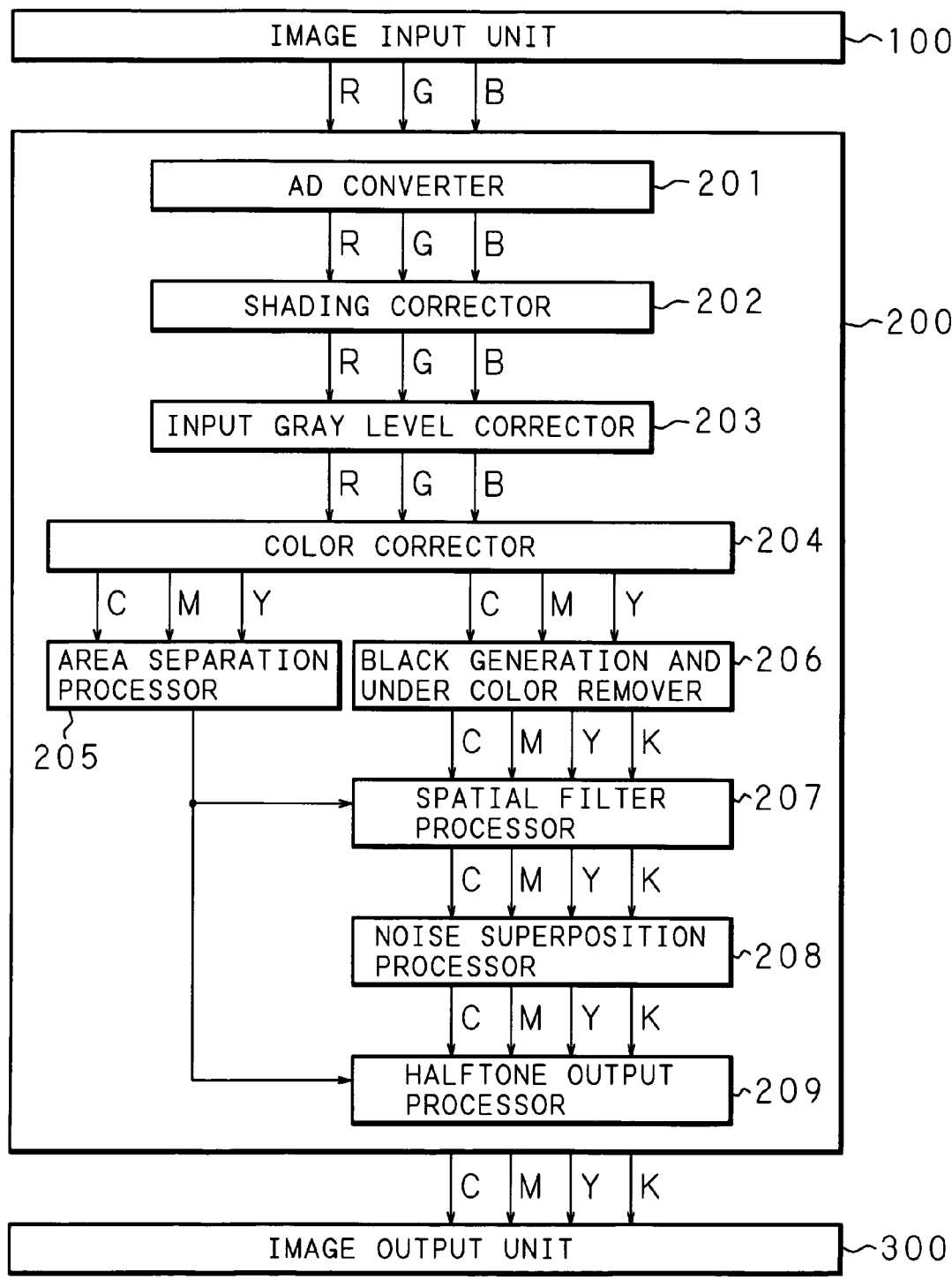
FIG. 6 is a block diagram for describing an internal configuration of an image forming apparatus according to an embodiment of the present invention.

FIG. 6 is a block diagram for describing an internal configuration of an image forming apparatus according to Embodiment 2 of the present invention. The image forming apparatus according to this embodiment includes an image input unit 100, an image processing unit 200 and an image output unit 300. The image input unit 100 includes a light source for irradiating an original with light for reading, a CCD (Charge Coupled Device) line sensor and the like. The light reflected from the original is transformed into electrical signals decomposed into colors of red R, green G and blue B, thereby acquiring a color image signal (RGB reflectivity signal). The image data input to the image input unit 100 is processed by the image processing unit 200 in the manner described later. Then the image is output from the image output unit 300. The image output unit 300 includes an electrophotographic printing unit or an ink jet printing unit and functions to form an image on a sheet such as paper or OHP film.

The image processing unit 200 is configured of an analog-to-digital converter 201 (hereinafter, referred to as the AD converter 201), a shading corrector 202, an input gray level corrector 203, a color corrector 204, an area separation processor 205, a black generation and under color remover 206, a spatial filter processor 207, a noise superposition processor 208 and a halftone output processor 209.

The AD converter 201 converts an RGB reflectivity signal applied from the image input unit 100 from analog to digital form. The shading corrector 202 performs shading correction process of the RGB reflectivity signal acquired by AD conversion. The shading correction is performed to remove various distortions in the image signal attributable to configurations of a lighting system, an image-forming system and an image pickup system of the image input unit 100.

The input gray level corrector 203 performs the input gray level correction process of the RGB reflectivity signal subjected to the shading correction. The input gray level correction process is intended to convert the RGB reflectivity signal to a density signal suitable for image processing. The input gray level corrector may further execute color balance processing for the RGB reflectivity signal. The color corrector 204 converts the density signal of RGB into the density signal of CMY (C: cyan, M: Magenta, Y: yellow) (hereinafter referred to simply as the CMY signal), and further executes a color correcting process for the CMY signal to realize the faithful color reproduction in the image output unit 300. Specifically, this color correcting process is intended to remove, from the CMY signal, the color impurity based on the spectral characteristic of the CMY toner or ink containing unnecessary absorbed components.

The area separation processor 205 executes an area separating process based on the CMY density signal output from the color corrector 204. The result of separation by the area separation processor is applied to the black generation and under color remover 206 and the spatial filter processor 207. The result of separation is applied also to the halftone output processor 209 as required.

The black generation and under color remover 206 executes a black generating process to generate the color signal of black (K) based on the CMY signal output from the color corrector 204, while at the same time executing a process of removing the under color generated from the CMY signal. The under color removal process is intended to acquire a new CMY color signal by subtracting the black color signal generated in the black generating process from the CMY signal. As the result of this process, the CMY density signal is converted to an image data composed of the CMYK color signal (hereinafter, referred to as the CMYK image data).

The spatial filter processor 207 executes a spatial filtering process using a digital filter for the CMYK image data obtained in the black generation and under color remover 206. As a result, the spatial frequency response of the image is corrected and, therefore, the image output from the image output unit 300 is prevented from being blurred or deteriorated in graininess.

The noise superposition processor 208 includes a noise generator having a similar circuit configuration to the one described in Embodiment 1. In this noise superposition processor 208, the noise data output from the noise generator is superposed on the CMYK image data after the spatial filtering process.

The halftone output processor 209 executes a gray level correcting process and a halftone generating process for the CMYK image data after noise superposition process. The halftone generating process is intended to make it possible to reproduce the gray level by dividing an image into a plurality of pixels using the binary or multi-valued dither method or the error diffusion method etc. The halftone output processor 209 may execute a process of converting the density value of the image data into the halftone dot area ratio providing a characteristic value of the image output unit. The density signal processed by the halftone output processor 209 is applied to the image output unit 300. The operation described above is controlled by a CPU (Central Processing Unit), not shown.

In this embodiment, the present invention is described above as an application to an image forming apparatus such as the digital copying machine or the ink jet copying machine. Nevertheless, the present invention is applicable also to the configuration of an image processing apparatus in which an image processing chip is mounted on an information processing apparatus such as a personal computer to execute the process of the image processing unit 200 described above. In this case, an image input apparatus such as a scanner and image output apparatus such as the laser printer or the ink jet printer are connected to the information processing apparatus to construct an image processing system. In the image processing system, the information processing apparatus superposes the noise data on the image data input through the image input apparatus, and the image output apparatus forms an image based on the image data superposed with the noise data.

Also, the noise data output from the pseudo-random number generator according to the present invention can be used as noise data in a blue noise mask method for reproducing the halftone in image processing. In the blue noise mask method, the halftone is reproduced utilizing the fact that the visual sensitivity of the human being is low at high frequency. This method uses the noise data mainly including a high-frequency component as a threshold of the input image data, and therefore a superior output image can be obtained even with a smaller number of gray levels than the input image data.

As this invention may be embodied in several forms without departing from the spirit of essential characteristics thereof, the present embodiments are therefore illustrative and not restrictive, since the scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A signal processing method for superposing a noise signal generated based on pseudo-random numbers on an input signal to generate an output signal, comprising the steps of:
    generating a predetermined number of pseudo-random numbers having different phases;
    executing a convolution operation with the generated pseudo-random numbers and coefficients determined by a desired frequency characteristic of the output signal;
    instructing the generating of the predetermined number of pseudo-random numbers having different phases to start generating and to stop generating;
    stopping the generation of the predetermined number of pseudo-random numbers for initialization, and setting the phase of a pseudo-random number to be different from the phase of another pseudo-random number during the initialization; and
    generating a noise signal to be superposed on the input signal, based on the result of the convolution operation,
    wherein the generating of the predetermined number of pseudo-random numbers having different phases is preformed by a plurality of generating paths, wherein one path of the plurality of generating paths generating pseudo-random numbers at a phase different from a phase of another path of the plurality of generating paths generating pseudo-random numbers.

2. signal output apparatus for outputting a noise signal generated based on pseudo-random numbers, comprising:
    a device generating a predetermined number of pseudo-random numbers having different phases;
    a filter executing a convolution operation with the generated pseudo-random numbers based on a coefficient and coefficients determined by a desired frequency characteristic of the noise signal; and
    a controller controls the device and the filter, wherein
    the controller controls the device to set the phase of a pseudo-random number to be different from the phase of another pseudo-random number,
    the controller controls the filter to set the coefficients of the filter to function as a high- pass filter when it is determined the desired frequency characteristic of the noise signal is to mainly include a high frequency component, and
    the controller controls the filter to set the coefficients of the filter to function as a low-pass filter when it is determined the desired frequency characteristic of the noise signal is to mainly include a low frequency component, and
    wherein the noise signal to be output is generated based on the result of the convolution operation, and,
    wherein the device includes a plurality of parallel devices each generating pseudo-random numbers having different phases.

3. A signal processing apparatus for superposing a noise signal generated based on pseudo-random numbers on an input signal to generate an output signal, comprising:
   a device generating a predetermined number of pseudo-random numbers having different phases;
   a filter executing a convolution operation with the generated pseudo-random numbers and coefficients determined by a desired frequency characteristic of the output signal; and
   a controller controls the device and the filter, wherein
   the controller starts and stops the device from generating the predetermined number of pseudo-random numbers, where the controller stops device from generating to initialize the device, wherein the controller initializes the device by setting the phase of a pseudo-random number to be different from the phase of another pseudo-random number,
   the controller controls the filter to set the coefficients of the filter to function as a high-pass filter when it is determined the desired frequency characteristic of the noise signal is to mainly include a high frequency component,
   the controller controls the filter to set the coefficients of the filter to function as a low-pass filter when it is determined the desired frequency characteristic of the noise signal is to mainly include a low frequency component, and
   wherein the noise signal to be superposed on the input signal is generated based on the result of the convolution operation, and,
   wherein the device includes a plurality of parallel devices each generating pseudo-random numbers having different phases.

4. An image processing apparatus for superposing a noise signal generated based on pseudo-random numbers on an input image signal to generate an output signal, comprising:
   a device generating a predetermined number of pseudo-random numbers having different phases; and
   a filter executing a convolution operation with the generated pseudo-random numbers and coefficients determined by a desired spatial frequency response of the output image signal; and
   a controller controls the filter, wherein
   the controller controls the filter to set the coefficients of the filter to function as a high-pass filter when it is determined the desired frequency characteristic of the noise signal is to mainly include a high frequency component, and
   the controller controls the filter to set the coefficients of the filter to function as a low-pass filter when it is determined the desired frequency characteristic of the noise signal is to mainly include a low frequency component, and
   wherein the noise signal to be superposed on the input image signal is generated based on the result of the convolution operation, and,
   wherein the device includes a plurality of parallel devices each generating pseudo-random numbers having different phases.

5. The image processing apparatus according to claim 4, further comprising:
   a plurality of LFSRs (Linear Feedback Shift Registers), wherein an output value of one of the LFSRs has a phase difference with output values of the other LFSRs.

6. The image processing apparatus according to claim 5, further comprising:
   a normalizer for normalizing the result of the convolution operation.

7. The image processing apparatus according to claim 4, wherein a predetermined number of pseudo-random numbers are generated based on a linear congruent method.

8. The image processing apparatus according to claim 7, further comprising:
   a normalizer for normalizing the result of the convolution operation.

9. The image processing apparatus according to claim 4, further comprising:
   a normalizer for normalizing the result of the convolution operation.

10. An image forming apparatus comprising:
    the image processing apparatus according to claim 4; and
    an image output unit for forming an image on a sheet based on an output image signal generated by the image processing apparatus.

11. The image forming apparatus according to claim 10, wherein the image processing apparatus comprises a plurality of LFSRs (Linear Feedback Shift Registers), and wherein an output value of one of the LFSRs has a phase difference with output values of the other LFSRs.

12. The image forming apparatus according to claim 10, wherein the image processing apparatus generates a predetermined number of pseudo- random numbers based on a linear congruent method.

13. The image forming apparatus according to claim 10, further comprising:
    a normalizer for normalizing the result of the convolution operation.

14. The signal processing method according to claim 1, wherein the method further comprising:
    instructing the generating of the predetermined number of pseudo-random numbers having different phases to start operating and to stop operating.

15. The signal processing apparatus according to claim 2, further comprises:
    a controller instructing the device to start operating and to stop operating.

16. The signal processing method according to claim 1, further comprising:
    controlling the executing of the convolution operation to function as either a high-pass filtering function or a low-pass filtering function depending on the location of noise data.

17. The signal processing apparatus according to claim 2, further comprises:
    a controller controlling the filter to function as either a high-pass filtering function or a low-pass filtering function depending on the location of noise data.

* * * * *